(12) United States Patent
Castaneda Zuniga et al.

(10) Patent No.: US 10,696,763 B2
(45) Date of Patent: Jun. 30, 2020

(54) PROCESS FOR THE PRODUCTION OF ETHYLENE POLYMERS

(71) Applicant: SABIC Global Technologies B.V., Bergen op Zoom (NL)

(72) Inventors: Diego Mauricio Castaneda Zuniga, Maastricht (NL); Peter Neuteboom, Hoensbroek (NL); Jan Nicolaas Eddy Duchateau, Paal (BE); Carolina de los Angeles Toloza Porras, Maastricht (NL); Franciscus Petrus Hermanus Schreurs, Maastricht (NL); Jerome Vachon, Geleen (NL)

(73) Assignee: SABIC Global Technologies B.V., Bergen op Zoom (NL)

( * ) Notice: Subject to any disclaimer, the term of this patent is extended or adjusted under 35 U.S.C. 154(b) by 103 days.

(21) Appl. No.: 15/755,123

(22) PCT Filed: Jul. 14, 2016

(86) PCT No.: PCT/EP2016/066789
§ 371 (c)(1),
(2) Date: Feb. 26, 2018

(87) PCT Pub. No.: WO2017/032506
PCT Pub. Date: Mar. 2, 2017

(65) Prior Publication Data
US 2018/0223019 A1 Aug. 9, 2018

(30) Foreign Application Priority Data

Aug. 26, 2015 (EP) .................................. 15182545

(51) Int. Cl.
*C08F 210/02* (2006.01)
*C08F 2/02* (2006.01)

(52) U.S. Cl.
CPC .............. *C08F 210/02* (2013.01); *C08F 2/02* (2013.01)

(58) Field of Classification Search
CPC combination set(s) only.
See application file for complete search history.

(56) References Cited

U.S. PATENT DOCUMENTS 3,424,811 A * 1/1969 Mango ...................... C07C 6/06
585/506

FOREIGN PATENT DOCUMENTS

| CA | 2795843 | * | 5/2011 |
| EP | 0776909 | A1 | 6/1997 |
| WO | 9926989 | A1 | 6/1999 |
| WO | 2011057764 | A1 | 5/2011 |
| WO | WO2011057764 | * | 5/2011 |
| WO | 2011138400 | A1 | 11/2011 |

OTHER PUBLICATIONS

International Search Report for International Application No. PCT/EP2016/066789; dated Sep. 26, 2016; 3 pages.
Lloyd, L., "Olefin Polymerization Catalysts"; Handbook of Industrial Catalysts, 2011, pp. 311-350.
Peacock, "Handbook of Polyethylene: Structures, Properties, and Applications," Marcel Dekker, Inc. New York, 2000, pp. 43-66.
Written Opinion of the International Search Report for International Application No. PCT/EP2016/066789; dated Sep. 26, 2016; 4 pages.

* cited by examiner

*Primary Examiner* — Monique R Peets
(74) *Attorney, Agent, or Firm* — Cantor Colburn LLP

(57) ABSTRACT

The present invention relates to a process for the production of ethylene polymers in a tubular reactor comprising reacting in said tubular reactor a feed composition comprising ethylene and one or more composition comprising one or more cyclic olefin wherein the cyclic olefin is a compound having the structure of Formula (I): wherein R may be a moiety comprising ≥1 and ≤10 carbon atoms; wherein $R^1$ and $R^2$ may each individually be hydrogen or a moiety comprising ≥1 and ≤5 carbon atoms, $R^1$ and $R^2$ may be the same or different; wherein • the tubular reactor may be operated at a pressure of ≥200 and ≤280 MPa; • the average reaction peak temperature may be ≥220° C. and ≤300° C.; • the composition comprising one or more cyclic olefin may be fed to the reactor in one or more feed inlet of said tubular reactor; and • said cyclic olefin may be fed to the tubular reactor in quantities of ≤1.0 mol %, with regards to the total feed composition. Such process allows for the production of ethylene polymers having a high density and a high purity.

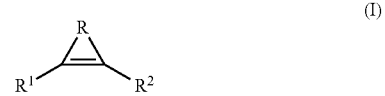

20 Claims, No Drawings

PROCESS FOR THE PRODUCTION OF ETHYLENE POLYMERS

CROSS REFERENCE TO RELATED APPLICATIONS

This application is a 371 of International Application No. PCT/EP2016/066789, filed Jul. 14, 2016, which claims priority to European Patent No. 15182545.2, filed Aug. 26, 2015, both of which are incorporated herein by reference in their entirety.

The present invention relates to a process for the production of high-density ethylene polymers in a free-radical high-pressure polymerization process with improved energy efficiency.

Ethylene polymers are well known in the art. There are a great variety of applications in which ethylene polymers find their field of application. A great variety of ethylene polymers are available, having properties that render them suitable for specific applications.

One type of ethylene polymers is high-density polyethylene. High-density polyethylenes are polymers that have amongst others a certain low permeability to oxygen and water vapour compared to other ethylene polymers. High-density polyethylenes may for example have a density as measured according to ISO 1183-1 (2012), method A, of ≥935 and ≤970 kg/m³.

Ethylene polymers may for example be produced by catalytic polymerisation processes or alternatively via free-radical high-pressure polymerisation processes. Such processes are well known in the art, and described in for example "Handbook of Polyethylene", A. Peacock, ISBN 0824795466, Dekker, 2000, p. 43-66. Catalytic polymerisation processes for example include processes in which catalysts systems of the Ziegler type, of the Phillips type, and/or of the single-site type are used. These types of catalyst systems are well known in the art and for example described in "Olefin Polymerisation Catalysts", L. Lloyd, in "Handbook of Industrial Catalysts", p. 311-350, ISBN 9780387246826, 2011.

Production of ethylene polymers via catalytic polymerisation processes has certain drawbacks. For example, ethylene polymers produced using such processes may contain traces of undesirable compounds originating from the catalyst system used in the production of such ethylene polymers. Ethylene polymers produced via catalytic polymerisation processes in the presence of catalysts systems of the Ziegler type commonly contain traces of tetrahydrofuran. Ethylene polymers produced via catalytic polymerisation processes in the presence of catalyst systems of the Phillips type commonly contain traces of chromium. Ethylene polymers produced via catalytic polymerisation processes in the presence of catalyst systems of the single-site type commonly contain traces of zirconium and/or hafnium.

The presence of such traces may be detrimental for the long-term stability of the ethylene polymer. Also, such traces may render the ethylene polymer unsuitable for certain areas of application where a high purity is required. Such areas of application are for example certain healthcare applications and food packaging applications, such as flexible films for packaging of fresh foods such as for example fruit juices, dairy products, meat, cheese, fish, fruits, vegetables and/or baked goods.

In order to avoid the presence of such traces of undesirable compounds, ethylene polymers may for example be produced in a free-radical high-pressure polymerisation process. Such free-radical high-pressure polymerisation process may for example be conducted in an autoclave reactor and/or a tubular reactor. For example, such free-radical high-pressure polymerisation process may be conducted in a tubular reactor.

However, free-radical high-pressure polymerisation processes operated in tubular reactors according to the state of the art suffer from the disadvantage that, in order to obtain ethylene polymers having a high density, such as a density of ≥935 kg/m³, the processes need to be operated at very high pressure, such as for example ≥290 MPa. To obtain such pressure, a large quantity of energy is to be provided by the feed compressors. Also, such processes suffer from the drawback that the average reaction peak temperature has to be maintained at certain maximum temperatures, such as for example ≤220° C. to reach the desired density, which leads to a low conversion of monomers to ethylene polymer.

Processes for the production of ethylene polymers in tubular reactors at high pressure are for example described in WO2011057764A1, which presents a process for the production of ethylene polymers having a density of 934 kg/m³. However, this process requires the pressure of the feed composition that is entered into the tubular reactor to be above 3000 bar, in order to arrive at ethylene polymers of such density. This requires a high energy input to compress the feed composition. In addition, the process presented in WO2011057764A1 is operated at an average reaction peak temperature of below 220° C. However, this leads to a limitation in conversion of feed composition to ethylene polymer.

It is therefore desired to have access to a free-radical high-pressure polymerisation process for producing high-density ethylene polymers having a density of for example ≥935 kg/m³ in a tubular reactor with reduced compressor energy consumption and high conversion of feed composition to ethylene polymer.

This objective has now been achieved according to the present invention by a process for the production of ethylene polymers having a density of ≥935 kg/m³ as measured according to ISO 1183-1 (2012), method A. in a tubular reactor comprising reacting in said tubular reactor a feed composition comprising ethylene and one or more composition comprising one or more cyclic olefin wherein the cyclic olefin is a compound having the structure of Formula (I):

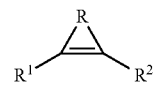

Formula (I)

wherein R may be a moiety comprising ≥1 and ≤10 carbon atoms;

wherein $R^1$ and $R^2$ may each individually be hydrogen or a moiety comprising ≥1 and ≤5 carbon atoms, $R^1$ and $R^2$ may be the same or different;

wherein
the tubular reactor may be operated at a pressure of ≥200 and ≤280 MPa;
the average reaction peak temperature may be ≥220° C. and ≤300° C.;
the composition comprising one or more cyclic olefin may be fed to the reactor in one or more feed inlet of said tubular reactor; and said cyclic olefin may be fed to the tubular reactor in quantities of ≤1.0 mol %, with regards to the total feed composition.

The process for production of ethylene polymers having a high density, such as a density of ≥935 kg/m³ in a tubular reactor may for example be operated at a pressure of ≥200 MPa, alternatively ≥220 MPa, alternatively ≥240 MPa. Such free-radical high-pressure polymerisation process may for example be operated at a pressure of ≤280 MPa, alternatively ≤260 MPa, alternatively ≤250 MPa. For example, such free-radical high-pressure polymerisation process may be operated at a pressure of ≥200 MPa and ≤280 MPa, alternatively ≥220 MPa and ≤280 MPa, alternatively ≥220 MPa and ≤250 MPa.

Such process allows for the production of ethylene polymers at low energy consumption per quantity of ethylene polymer produced.

Such tubular reactor may for example be a reactor having a length of ≥1000 m and ≤5000 m. The tubular reactor may for example have a ratio of length to inner diameter of ≥1000:1, alternatively ≥10000:1, alternatively ≥25000:1, such as ≥10000:1 and ≤50000:1, alternatively ≥25000:1 and ≤35000:1. The residence time may for example be ≥60 s and ≤300 s. Such tubular reactors may for example have an inner tubular diameter of ≥0.01 m and ≤0.20 m, alternatively ≥0.04 m and ≤0.15 m. The tubular reactor may for example have one or more inlet(s) and one or more outlet(s). The feed composition may for example be fed to the tubular reactor at the inlet of the tubular reactor. The ethylene polymer may for example be obtained from the outlet of the tubular reactor. The stream that exits the tubular reactor from the outlet may for example comprise ethylene polymer. The stream that exits the tubular reactor from the outlet may for example further comprise unreacted feed composition. Such unreacted feed composition may be recycled into the tubular reactor via one or more inlet.

The tubular reactor for operating the process according to the present invention may be the sole reactor in a configuration for production of ethylene polymers, or may be present in such configuration connected in series with one or more further tubular reactor(s) and/or one or more autoclave reactor(s). In such configuration involving multiple reactors in series, the tubular reactor for operating the process according to the present invention may be positioned as first reactor in such series. Alternatively, the tubular reactor for operating the process according to the present invention may be positioned subsequent to one or more further tubular reactor(s) and/or one or more autoclave reactor(s). For example, the tubular reactor for operating the process according to the present invention may be positioned as first reactor in such series connected to one further tubular reactor. Alternatively, the tubular reactor for operating the process according to the present invention may be positioned as first reactor in such series connected to one autoclave reactor.

In the context of the present invention, ethylene polymers are to be understood to be polymers in which ≥80% of the recurring units are derived from ethylene, alternatively ≥90%, alternatively ≥95%, alternatively ≥98%, with regards to the total number of recurring units in the polymer. Recurring units are to be understood to be the elements of the polymer molecule that are part of the molecular chain. Such units may for example be originating from unsaturated monomers comprising one or more carbon-carbon double bond(s) capable of reacting in free-radical polymerisation reactions. For example, such unsaturated monomers may be olefinic monomers. Such free-radical polymerisation reactions are well known in the art and for example described in 'Introduction to Polymers', Chapman & Hall, 1995, p. 43-68.

The feed composition that enters the tubular reactor may for example comprise ethylene. The feed composition may for example comprise ≥80.00%, alternatively ≥85.00%, alternatively ≥90.00%, alternatively ≥95.00% by mole of ethylene, with regards to the total of said feed composition. The feed composition may for example comprise ≤99.99%, alternatively ≤99.95%, alternatively ≤99.90%, alternatively ≤99.50% by mole of ethylene, with regards to the total of said feed composition. For example, the feed composition may comprise ≥80.00% and ≤99.99%, alternatively ≥85.00% and ≤99.90%, alternatively ≥90.00% and ≤99.50% by mole of ethylene, with regard to the total of said feed composition.

The feed composition may for example comprise ≤5.00%, alternatively ≤3.00%, alternatively ≤1.00%, alternatively ≤0.50%, alternatively ≤0.30% by mole of cyclic olefins, with regard to the total of said feed composition. The feed composition may for example comprise ≥0.01%, alternatively ≥0.02%, alternatively ≥0.05%, alternatively ≥0.10% by mole of cyclic olefins, with regard to the total of said feed composition. For example, the feed composition may comprise ≥0.01% and ≤5.00%, alternatively ≥0.05% and ≤1.00%, alternatively ≥0.10% and ≤0.50% by mole of cyclic olefins, with regard to the total of said feed composition.

The production of ethylene polymers in a tubular reactor may for example be operated using a temperature profile having one or more temperature peaks, such as for example 2 temperature peaks, alternatively 3 temperature peaks, alternatively 4 temperature peaks, alternatively 5 temperature peaks, alternatively 6 temperature peaks. The average reaction peak temperature is to be understood to be the arithmetic mean of the temperatures of the peaks in the reaction temperature profile along the tubular reactor. For example, the process is operated at an average reaction peak temperature of ≥220° C., alternatively ≥230° C., alternatively ≥240° C., alternatively ≥250° C., alternatively ≥260° C., alternatively ≥270° C. Such temperature profile may be obtained by feeding a free-radical initiator composition at one or more feed inlets along the tubular reactor. The free radical initiator composition may for example comprise one or more compounds selected from air, oxygen, organic peroxides or azo compounds.

The production of ethylene polymers at such average reaction peak temperatures leads to a comparatively high conversion rate. Conversion rate is to be understood to be the weight % of the feed composition that is converted to ethylene polymer during the reaction between feed at an inlet and removal at an outlet.

In an embodiment, the present invention relates to a process wherein said cyclic olefin may be one or more selected from cyclobutene, cyclopentene, cyclohexene, cycloheptene, cyclooctene, cyclooctadiene, cyclononene, cyclodecene, 1-methyl-1-cyclohexene, 3-methyl cyclohexene, alpha-pinene, and/or norbornene For example, said cyclic olefin may be one or more selected from cyclohexene, cyclooctene and/or cyclooctadiene.

Suitable organic peroxides for use in the initiator composition may for example include peroxy esters, peroxy ketals, peroxy ketones and peroxycarbonates, e.g. di(2-ethylhexyl) peroxydicarbonate, dicyclohexyl peroxydicarbonate, diacetyl peroxydicarbonate, tert-butyl peroxyisopropylcarbonate, di-tert-butyl peroxide, di-tert-amyl peroxide, dicumyl peroxide, 2,5-dimethyl-2,5-di-tert-butylperoxyhexane, tert-butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethylhexanoyl-peroxy) hexane, tert-amyl peroxy-2-ethylhexanoate, dibenzoyl peroxide, tert-butyl peroxy-2 ethyl-hexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butyl-peroxy)cyclohexane, tert-butyl peroxyacetate, cumyl peroxyneodecanoate, tert-amyl peroxy-neodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert-butyl peroxy benzoate, methyl isobutyl ketone hydroperoxide, 3,6,9-triethyl-3,6,9-trimethyl-triperoxocyclononane, 3,3,6,6,9,9,-hexamethyl-1,2,4,5-tetraoxacyclononane, n-ethyl-4-4,-di-tert-butyl peroxyvalerate, ethyl-3,3,-di-tert-amyl peroxy butyrate, 2,2-di-4,4-di-tert-butyl peroxycyclohexyl propane, 1,1-di-tert-amyl peroxycyclohexane, 1,4-di-tert-butyl peroxycarbocyclohexane and 2,2-di(tert-butylperoxy)butane. Azoalkanes (diazenes), azodicarboxylic esters, azodicarboxylic dinitriles such as azobisisobutyronitrile and hydrocarbons which decompose into free radicals and are also referred as C—C initiators, e.g. 1,2-diphenyl-1,2-dimethylethane derivatives and 1,1,2,2-tetramethylethane derivatives, are also suitable. It is possible to use either individual initiators or preferably mixtures of various initiators. In general the concentration of added initiator is less than 300 ppm, alternatively less than 250 ppm, alternatively less than 200 ppm, with regard to the total of the materials fed to the tubular reactor. Thus, the resulting resins are not greatly contaminated by initiator residues and normally require no purification prior to use. The free radical initiator composition may for example be fed to the tubular reactor in a pure form or as a solution in a solvent. The solvent may comprise the cyclic olefin and/or one or more compound(s) selected from $C_2$-$C_{20}$ normal or iso-paraffins or mixtures thereof, such as for example mixtures of $C_{10}$-$C_{13}$ normal paraffins. The solutions comprise the initiators or initiator mixtures in proportions of from 2 to 65% by weight, preferably from 5 to 40% by weight and particularly preferably from 10 to 30% by weight.

In addition, further modifiers may be fed to the tubular reactor. Examples of such modifiers may include inhibitors, scavengers and/or chain transfer agents, such as aldehydes, ketones and aliphatic hydrocarbons. Such modifiers may for example be fed to the tubular reactor in a pure form or as a solution in a solvent.

Examples of suitable chain transfer agents include cyclopropane, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichlorethane, acetonitrile, N-ethylacetamide, propylene, n-decane, N,N-diethylacetamide, cyclopentane, acetic anhydride, n-tridecane, n-butyl benzoate, isopropanol, toluene, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1,2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1,1,2-dibromoethane, dimethylamine, benzaldehyde, chloroform, 2-ethylhexene-1, propionaldehyde, 1,4-dichlorobutene-2, tri-n-butylphosphine, dimethylphosphine, methyl cyanoacetate, carbon tetrachloride, bromotrichloromethane, di-n-butylphosphine, acetaldehyde, hydrogen and phosphine.

Preferably, the polymerization is performed in the presence of a chain transfer agent selected from the group consisting of propionaldehyde, n-heptane, propane, isopropanol and acetone.

The production of ethylene polymers in tubular reactors has the advantage that it allows for a controlled molecular weight distribution of the obtained polymers. The production of ethylene polymers in tubular reactors also presents an effective process in terms of low consumption of utilities such as for example cooling water and energy such as for example electrical energy. The production of ethylene polymers in tubular reactors allows for production of large quantities of ethylene polymers of a controlled quality.

In an embodiment, the present invention relates to a process wherein the ethylene polymer may be produced with a compressor energy consumption of ≤0.80 MW/ton ethylene polymer.

For example, the compressor energy consumption may be ≤0.70 MW/ton ethylene polymer, alternatively ≤0.60 MW/ton ethylene polymer. The compressor energy consumption is to be understood to be the quantity of energy required to pressurize the feed composition from 25 MPa to the pressure required in the tubular reactor.

In an embodiment, the present invention relates to a process wherein at least a fraction of the cyclic olefin may be fed to the tubular reactor as part of a composition further comprising one or more free radical initiator.

In an embodiment, the present invention relates to a process wherein said composition comprising one or more cyclic olefins may comprise said one or more free radical initiator as a solution in one or more of said one or more cyclic olefins.

By feeding the free-radical initiator as a solution comprising an amount of cyclic olefin comonomer, the use of a certain quantity of additional solvent is avoided. By using the cyclic olefin as a reactive solvent, i.e. a solvent to the free-radical initiator that to a certain degree reacts along the length of the tubular reactor and thus for the reacted portion does not end up in the recycle stream comprising unreacted feed composition that may need to be separated from the product exiting the tubular reactor in a separation section. Furthermore, the use of the cyclic olefin as reactive solvent may reduce the quantity of solvent that ends up in the ethylene polymer obtained from the process.

In an embodiment, the present invention relates to a process wherein said composition comprising one or more cyclic olefins may be fed to the tubular reactor at a first feed inlet and at least a second feed inlet, in which said second feed inlet is located at a position along the tubular reactor downstream from said first inlet, in the direction of the product flow in the tubular reactor.

Addition of cyclic olefins at multiple inlets may contribute to controlling the build-in of cyclic olefins into the ethylene polymer.

In an embodiment, the present invention relates to a process wherein said composition comprising one or more cyclic olefins further comprising one or more free radical initiator may be fed to the tubular reactor at a first feed inlet and at least a second feed inlet, wherein said second feed inlet is located at a position along the tubular reactor downstream from said first inlet, in the direction of the product flow in the tubular reactor.

Addition of free radical initiator composition at multiple inlets may contribute to controlling the average peak reaction temperature.

In an embodiment, the present invention relates to a process wherein the composition comprising one or more cyclic olefins further comprising one or more free radical initiator that is fed to the tubular reactor at said first feed inlet may be different in composition compared to the composition comprising one or more cyclic olefins further comprising one or more free radical initiator that is fed to the tubular reactor at said second feed inlet.

Tailoring the quantity and type of feed of cyclic olefins at different inlets may contribute to optimisation of the build-in of cyclic olefins into the ethylene polymers. Tailoring the quantity and type of free radical initiator at different inlets may contribute to controlling the average peak reaction temperature.

In an embodiment, the present invention relates to a process wherein the quantity of cyclic olefins that are fed to the first feed inlet of the tubular reactor may be higher than the quantity of cyclic olefins that are fed to at least one subsequent feed inlet of the tubular reactor, wherein said subsequent feed inlet is located at a position along the tubular reactor downstream from said first inlet, in the direction of the product flow in the tubular reactor.

The ethylene polymers obtained with the process according to the present invention may for example have a density as measured according to ISO 1183-1 (2012), method A of ≥935 and ≤970 kg/m$^3$. For example, the ethylene polymers according to the present invention may have a density of ≥935 kg/m$^3$, alternatively ≥936 kg/m$^3$, alternatively ≥939 kg/m$^3$, alternatively ≥940 k/m$^3$, alternatively ≥944 kg/m$^3$, alternatively ≥945 kg/m$^3$. For example, the ethylene polymers according to the present invention may have a density of ≤970 kg/m$^3$, alternatively ≤969 kg/m$^3$, alternatively ≤965 kg/m$^3$, alternatively ≤960 kg/m$^3$, alternatively ≤959 kg/m$^3$ alternatively ≤955 kg/m$^3$, alternatively ≤954 kg/m$^3$. For example, the ethylene polymers according to the present invention may have a density of ≥935 kg/m$^3$ and ≤970 kg/m$^3$, alternatively ≥936 kg/m$^3$ and ≤965 kg/m$^3$, alternatively ≥939 kg/m$^3$ and ≤959 kg/m$^3$, alternatively ≥944 kg/m$^3$ and ≤954 kg/m$^3$.

The ethylene polymer may for example have a molecular weight distribution, also referred to as MWD, as determined according to ISO 16014-1 (2012) of ≥3.0, alternatively ≥4.0, alternatively ≥6.0. The ethylene polymer may for example have an MWD of ≤40.0, alternatively ≤30.0, alternatively ≤25.0. The ethylene polymer may for example have an MWD ≥3.0 and ≤40.0, alternatively ≥6.0 and ≤30.0. Said MWD is defined as the ratio between the weight average molecular weight $M_w$ and the number average molecular weight $M_n$, ($M_w/M_n$) as determined according to ISO 16014-1 (2012).

In an embodiment, the present invention relates to a polymer composition that may for example comprise an ethylene polymer obtained with the process according to the present invention. Such polymer composition may for example comprise ≥50.0 wt %, alternatively ≥75 wt %, alternatively ≥90 wt %, alternatively ≥95 wt % of the ethylene polymer, with regard to the total weight of the polymer composition.

Ethylene polymers obtained with the process according to the present invention may for example have a high purity and reduced extractables content.

Cyclic olefins according to formula I in which R is a moiety comprising ≥1 and ≤10 carbon atoms may be fed to a tubular reactor for the production of ethylene polymers in a liquid form.

In an embodiment, the present invention relates to an ethylene polymer having a density of ≥935 kg/m$^3$ as measured according to ISO 1183-1 (2012), method A.

In an embodiment, the present invention relates to the use of such ethylene polymer in the production of healthcare applications.

In an embodiment, the present invention relates to the use of such ethylene polymer in the production of food packages.

In an embodiment, the present invention relates to an article prepared using the ethylene polymer of the present invention.

Ethylene polymers obtained from the process according to the present invention may be suitable for use in applications such as for example certain healthcare applications and food packaging applications, such as flexible films for packaging of fresh foods such as for example fruit juices, dairy products, meat, cheese, fish, fruits, vegetables and/or baked goods.

The process according to the present invention presents a method to obtain the desired ethylene polymers of certain high density by a process in which, by conducting the process in an operating window providing a balance of relatively low pressure and relatively high average reaction peak temperature, the productivity of the process is increased and the energy consumption per quantity of ethylene polymer produced is reduced.

The invention will now be illustrated by the following non-limiting examples.

EXAMPLE I

In a high-pressure reactor, a feed composition of ethylene comprising 0.20 mol % of cyclooctene is to be fed at a pressure of 246 MPa and a compressor discharge temperature of 85° C. at a flow rate of 36.6 tons/h. As initiator, 250 ppm of a peroxide active at temperatures of 250-270° C. is to be fed as a solution in a mixture of $C_{10}$-$C_{13}$ normal paraffins. The average reaction peak temperature is to be maintained in the range 250-270° C. An ethylene polymer is obtained having a density of 940 kg/m$^3$. The work required to compress the feed composition from 25 MPa to 246 MPa was calculated to be 4.77 MW. 8.2 tons/h of ethylene polymer is to be produced. The conversion of feed composition to ethylene polymer is 22.5 wt %. The compressor energy consumption is 0.58 MW/ton ethylene polymer.

EXAMPLE II

In a high-pressure reactor, a feed composition of ethylene comprising 0.20 mol % of cyclohexene is to be fed at a pressure of 246 MPa and a compressor discharge temperature of 85° C. at a flow rate of 36.6 tons/h. As initiator, 150 ppm of a peroxide active at temperatures of 250-270° C. is to be fed as a solution in a mixture of $C_{10}$-$C_{13}$ normal paraffins. The average reaction peak temperature is to be maintained in the range 250-270° C. An ethylene polymer is obtained having a density of 936 kg/m$^3$. The work required to compress the feed composition from 25 MPa to 246 MPa was calculated to be 4.77 MW. 8.2 tons/h of ethylene polymer is to be produced. The conversion of feed composition to ethylene polymer is 22.5 wt %. The compressor energy consumption is 0.58 MW/ton ethylene polymer.

EXAMPLE III

In a high-pressure reactor, a feed composition of ethylene comprising 0.70 mol % of cyclooctene is to be fed at a pressure of 246 MPa and a compressor discharge temperature of 85° C. at a flow rate of 36.6 tons/h. As initiator, 180 ppm of a peroxide active at temperatures of 250-270° C. is to be fed as a solution in a mixture of $C_{10}$-$C_{13}$ normal paraffins. The average reaction peak temperature is to be maintained in the range 250-270° C. An ethylene polymer is obtained having a density of 938 kg/m³. The work required to compress the feed composition from 25 MPa to 246 MPa was calculated to be 4.77 MW. 8.2 tons/h of ethylene polymer is to be produced. The conversion of feed composition to ethylene polymer is 22.5 wt %. The compressor energy consumption is 0.58 MW/ton ethylene polymer.

EXAMPLE IV

In a high-pressure reactor, a feed composition of ethylene comprising 0.70 mol % of cyclohexene is to be fed at a pressure of 246 MPa and a compressor discharge temperature of 85° C. at a flow rate of 36.6 tons/h. As initiator, 180 ppm of a peroxide active at temperatures of 250-270° C. is to be fed as a solution in a mixture of $C_{10}$-$C_{13}$ normal paraffins. The average reaction peak temperature is to be maintained in the range 250-270° C. An ethylene polymer is obtained having a density of 937 kg/m³. The work required to compress the feed composition from 25 MPa to 246 MPa was calculated to be 4.77 MW. 8.2 tons/h of ethylene polymer is to be produced. The conversion of feed composition to ethylene polymer is 22.5 wt %. The compressor energy consumption is 0.58 MW/ton ethylene polymer.

EXAMPLE V

In a high-pressure reactor, a feed composition of ethylene comprising 0.20 mol % of cyclooctadiene is to be fed at a pressure of 246 MPa and a compressor discharge temperature of 85° C. at a flow rate of 36.6 tons/h. As initiator, 180 ppm of a peroxide active at temperatures of 250-270° C. is to be fed as a solution in a mixture of $C_{10}$-$C_{13}$ normal paraffins. The average reaction peak temperature is to be maintained in the range 250-270° C. An ethylene polymer is obtained having a density of 938 kg/m³. The work required to compress the feed composition from 25 MPa to 246 MPa was calculated to be 4.77 MW. 8.2 tons/h of ethylene polymer is to be produced. The conversion of feed composition to ethylene polymer is 22.5 wt %. The compressor energy consumption is 0.58 MW/ton ethylene polymer.

EXAMPLE VI (COMPARATIVE)

In a high-pressure reactor, a feed composition of ethylene is to be fed at a pressure of 246 MPa and a compressor discharge temperature of 85° C. at a flow rate of 36.6 kg/h. As initiator, 180 ppm of a peroxide active at temperatures of 250-270° C. is to be fed as a solution in a mixture of $C_{10}$-$C_{13}$ normal paraffins. The average reaction peak temperature is to be maintained in the range 250-270° C. An ethylene polymer is obtained having a density of 926 kg/m³. The work required to compress the feed composition from 25 MPa to 246 MPa was calculated to be 4.77 MW. 8.2 tons/h of ethylene polymer is to be produced. The conversion of feed composition to ethylene polymer is 22.5 wt %. The compressor energy consumption is 0.58 MW/ton ethylene polymer.

EXAMPLE VII (COMPARATIVE—ACCORDING TO WO2011057764)

In a high-pressure reactor, a feed composition of ethylene is to be fed at a pressure of 305 MPa and a compressor discharge temperature of 85° C. at a flow rate of 36.6 tons/h. As initiator, 180 ppm of a peroxide active at temperatures of 210-230° C. is to be fed as a solution in a mixture of $C_{10}$-$C_{13}$ normal paraffins. The average reaction peak temperature is to be maintained at 219° C. An ethylene polymer is obtained having a density of 934 kg/m³. The work required to compress the feed composition from 25 MPa to 305 MPa was calculated to be 5.53 MW. 6.2 tons/h of ethylene polymer is to be produced. The conversion of feed composition to ethylene polymer is 17.0 wt %. The compressor energy consumption is 0.89 MW/ton ethylene polymer.

Comparing examples I to V with VI shows that a process according to the present invention allows for production of an ethylene polymer having a higher density compared to the process according to the state of the art, at the same reactor pressure and the same work input for the compression.

Comparing examples I-V with VII shows that the process according to the present invention allows for production of an ethylene polymer having at least the same density or even higher density whilst reducing the energy required for the compression of the feed composition. Comparing examples I to V with VII shows that this reduction amounts over 16% of total energy required for compression.

The above examples clearly presents the present invention, being a process for the production of ethylene polymers in a tubular reactor using ethylene and one or more cyclic olefins as reactants, the process comprising reacting in said tubular reactor a feed composition comprising ethylene and one or more composition comprising one or more cyclic olefin wherein the cyclic olefin is a compound having the structure of Formula (I):

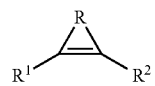

Formula (I)

wherein R is a moiety comprising ≥1 and ≤10 carbon atoms;

wherein $R^1$ and $R^2$ are each individually hydrogen or a moiety comprising ≥1 and ≤5 carbon atoms, $R^1$ and $R^2$ may be the same or different;

wherein
the tubular reactor is operated at a pressure of ≥200 and ≤280 MPa;
the average reaction peak temperature is ≥220° C. and ≤300° C.;
the composition comprising one or more of cyclic olefins is fed to the reactor in one or more feed inlet of said tubular reactor; and
said cyclic olefin is fed to the tubular reactor in quantities of ≤1.0 mol %, with regards to the total feed composition;

which allows for a reduction of the consumption of energy needed for compression of the feed composition that is fed to a tubular reactor for free-radical high-pressure polymerisation processes to obtain ethylene polymers, as well as allowing for production of ethylene polymers having a higher density at a given reactor pressure in such tubular reactor compared to the processes according to the state of the art.

The invention claimed is:

1. A process for the production of ethylene polymers having a density of ≥935 kg/m³ as measured according to ISO 1183-1 (2012), method A, in a tubular reactor comprising reacting in said tubular reactor a feed composition comprising ethylene and one or more composition comprising one or more cyclic olefin wherein the cyclic olefin is a compound having the structure of Formula (I):

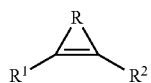

Formula (I)

wherein R is a moiety comprising ≥1 and ≤10 carbon atoms;
wherein $R^1$ and $R^2$ are each individually hydrogen or a moiety comprising ≥1 and ≤5 carbon atoms, $R^1$ and $R^2$ may be the same or different;
wherein
the tubular reactor is operated at a pressure of ≥200 and ≤280 MPa;
the average reaction peak temperature is ≥220° C. and ≤300° C.;
the composition comprising one or more of cyclic olefins is fed to the reactor in one or more feed inlet of said tubular reactor; and
said cyclic olefin is fed to the tubular reactor in quantities of ≤1.0 mol %, with regards to the total feed composition.

2. The process according to claim 1 wherein at least a fraction of the cyclic olefin is fed to the tubular reactor as part of a composition further comprising one or more free radical initiator.

3. The process according to claim 1 wherein said cyclic olefin is one or more selected from cyclobutene, cyclopentene, cyclohexene, cycloheptene, cyclooctene, cyclooctadiene, cyclononene, cyclodecene, 1-methyl- 1-cyclohexene, 3-methyl cyclohexene, alpha-pinene, and/or norbornene.

4. The process according to claim 3 wherein the ethylene polymer is produced with a compressor energy consumption of ≤0.80 MW / ton ethylene polymer.

5. The process according to claim 1 wherein said composition comprising one or more cyclic olefins is fed to the tubular reactor at a first feed inlet and at least a second feed inlet, in which said second feed inlet is located at a position along the tubular reactor downstream from said first inlet, in the direction of the product flow in the tubular reactor.

6. The process according to claim 2 wherein said composition comprising one or more cyclic olefins comprises said one or more free radical initiator as a solution in at least one of said one or more cyclic olefins.

7. The process according to claim 6 wherein said composition comprising one or more cyclic olefins further comprising one or more free radical initiator is fed to the tubular reactor at a first feed inlet and at least a second feed inlet, wherein said second feed inlet is located at a position along the tubular reactor downstream from said first inlet, in the direction of the product flow in the tubular reactor.

8. The process according to claim 7 wherein the composition comprising one or more cyclic olefins further comprising one or more free radical initiator that is fed to the tubular reactor at said first feed inlet is different in composition compared to the composition comprising one or more cyclic olefins further comprising one or more free radical initiator that is fed to the tubular reactor at said second feed inlet.

9. The process according to claim 7 wherein the quantity of cyclic olefins that are fed to the first feed inlet of the tubular reactor is higher than the quantity of cyclic olefins that are fed to at least one subsequent feed inlet of the tubular reactor, wherein said subsequent feed inlet is located at a position along the tubular reactor downstream from said first inlet, in the direction of the product flow in the tubular reactor.

10. The process according to claim 1 wherein the tubular reactor is operated at a pressure of ≥200 and ≤260 MPa.

11. The process according to claim 10 wherein the tubular reactor is operated at a pressure of ≥200 and ≤250 MPa.

12. The process according to claim 10 wherein the average reaction peak temperature is ≥240° C. and ≤300° C.

13. A process for the production of ethylene polymers having a density of ≥935 kg/m³ as measured according to ISO 1183-1 (2012), method A, in a tubular reactor comprising reacting in said tubular reactor a feed composition comprising ethylene and one or more composition comprising one or more cyclic olefin wherein the cyclic olefin is a compound having the structure of Formula (I):

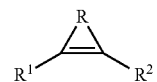

Formula (I)

wherein R is a moiety comprising ≥1 and ≤10 carbon atoms;
wherein $R^1$ and $R^2$ are each individually hydrogen or a moiety comprising ≥1 and ≤5 carbon atoms, $R^1$ and $R^2$ may be the same or different;
wherein
the tubular reactor is operated at a pressure of ≥200 and ≤280 MPa;
the average reaction peak temperature is ≥240° C. and ≤300° C.;
the composition comprising one or more of cyclic olefins is fed to the reactor in one or more feed inlet of said tubular reactor; and
said cyclic olefin is fed to the tubular reactor in quantities of ≤1.0 mol %, with regards to the total feed composition.

14. The process according to claim 13 wherein the average reaction peak temperature is ≥250° C. and ≤300° C.

15. The process according to claim 13 wherein the average reaction peak temperature is ≥260° C. and ≤300° C.

16. The process according to claim 13 wherein the average reaction peak temperature is ≥270° C. and ≤300° C.

17. A process for the production of ethylene polymers having a density of ≥935 kg/m³ as measured according to ISO 1183-1 (2012), method A, in a tubular reactor comprising reacting in said tubular reactor a feed composition comprising ethylene and one or more composition comprising one or more cyclic olefin wherein the cyclic olefin is a compound having the structure of Formula (I):

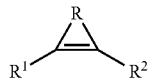

Formula (I)

wherein R is a moiety comprising ≥1 and ≤10 carbon atoms;
wherein $R^1$ and $R^2$ are each individually hydrogen or a moiety comprising ≥1 and ≤5 carbon atoms, $R^1$ and $R^2$ may be the same or different;
wherein
    the tubular reactor is operated at a pressure of ≥200 and ≤280 MPa;
    the average reaction peak temperature is ≥220° C. and ≤300° C.;
    the composition comprising one or more of cyclic olefins is fed to the reactor in one or more feed inlet of said tubular reactor; and
    said cyclic olefin is fed to the tubular reactor in quantities of ≤1.0 mol %, with regards to the total feed composition, and
wherein said cyclic olefin is one or more selected from cyclohexene, cyclooctene and/or cyclooctadiene.

18. The process according to claim 17 wherein said cyclic olefin is cyclohexene.

19. The process according to claim 17 wherein said cyclic olefin is cyclooctene.

20. The process according to claim 17 wherein said cyclic olefin is cyclooctadiene.

* * * * *